United States Patent
Deegan et al.

Patent Number: 5,552,711
Date of Patent: Sep. 3, 1996

[54] TURBINE ENGINE IMMINENT FAILURE MONITOR

[76] Inventors: Thierry Deegan, 39 Porter La.; William DiMarco, 1288 Anthony Rd., both of Portsmouth, R.I. 02871

[21] Appl. No.: 336,929

[22] Filed: Nov. 10, 1994

[51] Int. Cl.$^6$ .................................................. G01N 27/62
[52] U.S. Cl. ........................... 324/464; 324/501; 73/116; 340/629; 415/118
[58] Field of Search ................................ 324/378, 459, 324/464, 501, 555; 73/116; 250/336.1; 415/118; 340/627, 628, 629, 631

[56] References Cited

U.S. PATENT DOCUMENTS

| | | | |
|---|---|---|---|
| 2,981,062 | 4/1961 | Zeiden | 60/39.091 |
| 3,565,209 | 2/1971 | Babcock et al. | 73/116 X |
| 3,775,763 | 11/1973 | Couch et al. | 340/627 |
| 4,302,754 | 11/1981 | Magee et al. | 340/631 |
| 4,456,883 | 6/1984 | Bullis et al. | 324/464 |
| 4,584,531 | 4/1986 | Couch | 324/464 |
| 4,591,794 | 5/1986 | Shattuck et al. | 324/464 |
| 4,862,093 | 8/1989 | Jiewertz | 324/464 |
| 5,066,023 | 11/1991 | Ma | 324/464 X |
| 5,087,882 | 2/1992 | Iwata | 324/464 X |
| 5,230,240 | 7/1993 | Ohsawa et al. | 73/116 |

*Primary Examiner*—Kenneth A. Wieder
*Assistant Examiner*—Glenn W. Brown
*Attorney, Agent, or Firm*—Robert J. Doherty

[57] ABSTRACT

This invention is a method for determining when combustion cans or turbine blades are failing in gas turbine engines. It measures the specific ions emitted by hot spots of can and blade material when they have failed or are failing. The invention relies on the electromagnetic energy radiated by ions that are created as combustion gas erodes and ionizes the materials in these hot spots. Acceleration by the earth magnetic field and by acoustic and mechanical forces normally present in combustion machinery cause these charged particles to radiate identifiable electromagnetic emissions. The frequency of the radiation, being a function of the charge and mass of the particles, allows free ions in the exhaust stream to be identified. The device operates by measuring the electromagnetic spectrum and relating detected frequencies to the mass of the ions from can liner and blade materials. The device can be used in fixed installations such as power plants, ships and aircraft. It can be coupled to vibration measurement equipment for additional indications of failure.

7 Claims, 1 Drawing Sheet

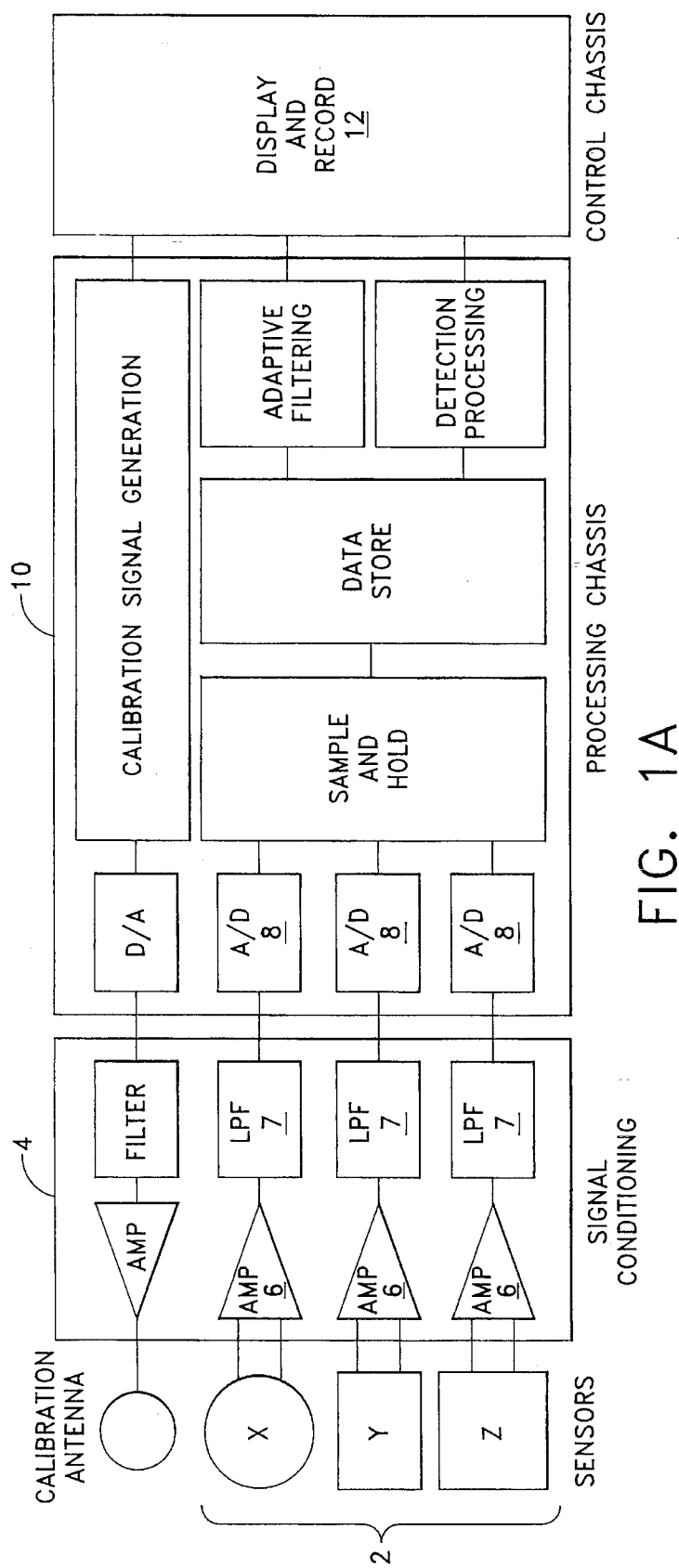
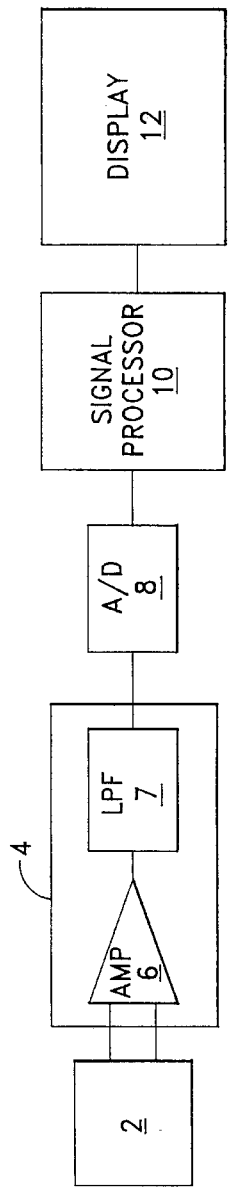
FIG. 1A
FIG. 1

TURBINE ENGINE IMMINENT FAILURE MONITOR

This invention uses low frequency electromagnetic emissions rather than the previous techniques of vibration analysis alone or simply waiting for functional failure. This method does not require the detection device to be inserted in the combustion exhaust stream. Its signal is not corrupted by atmospheric constituents between the emission source and the sensor. And its sensor is not sensitive to interfering light or dust. The novelty of this invention is the use of the very low frequencies of ions and ion-laden particulate in the exhaust stream to measure the output of ions from structural and blade materials.

BACKGROUND AND OBJECTS OF THE INVENTION

The failure of turbine blades and combustion cans is a substantial hazard to aircraft and power plants. Even when the engine does not fail catastrophically, the breach of a can wall or the loss of a blade tip can produce costly damage. There are few consistent indications of failure because neither the cans nor the turbine blades can be instrumented effectively.

Vibration measurement techniques require that enough of a rotating element be lost to cause a significant imbalance. In most cases this indication shows failure only after propagating damage has already occurred. For the failure of a combustion can, there is little indication in the vibration signature. Burn-through is detected when the fire is consuming much of the engine.

Combustion can burn-through and blade rupture are often preceded by the development of small flaws, intergranular cracking and some crystalline erosion. Combustion gas does not stream evenly past these discontinuities in the surfaces and these spots have inconsistent connectivity to coolant passages. Hot spots are created at these sites. These hot spots are subject to erosion by the combustion gas. The elevated temperature at these sites is also high enough to cause more than the average number of metallic ions to boil off the site.

Similarly, when a weakened turbine blade elongates to rub against the turbine casing, a few particles of the casing or blade tip can be worn away. Once in the combustion stream, the large ratio of surface area to volume makes the particle susceptible to burning and causing additional ion boil-off.

The invention presented monitors the presence of ions of the materials that make up the combustion cans, turbine blades, and turbine casings. These ions are influenced by the earth's magnetic field to radiate an electromagnetic emission whose frequency is a function of the ratio of charge to mass. The emission can be measured with a simple antenna and radio receiver tuned to the extremely low frequency of such emissions. The mass distribution of all ionized particles in the exhaust gas stream is directly related to the spectrum of the emissions.

Ion Source

Engines and burners use a hydrocarbon fuel with air whose combustion involves many chemical reactions and energy transfers. Some of these reactions produce ionic species. Ion concentrations of $10^{18}$ ions per cubic meter are reasonable for a typical combustion chamber. These ions are the means for this invention to operate. From elementary physics, any acceleration of a charge causes electromagnetic radiation to be produced. The earth's magnetic field imposes a force on the ion that accelerates it. This force causes each ion to radiate at the cyclotron frequency or gyrofrequency determined by $$\text{frequency} = \frac{\text{charge} \times \text{magnetic field}}{2 \text{ pi} \times \text{mass}}$$

This radiation is detected by the present invention. A few of the ions produced by hydrocarbon combustion in air and their gyrofrequencies for the typical earth magnetic field of 40,000 nanoteslas are listed in Table 1.

TABLE 1

Aircraft Fuel Combustion Ions and Gyrofrequencies

| Ion | Mass Number | Freq (Hz) | Ion | Mass Number | Freq (Hz) |
| --- | --- | --- | --- | --- | --- |
| $C^+$ | 12 | 53.1 | $S^+$ | 32 | 19.9 |
| $CH^+$ | 13 | 49.0 | $C3H3^+$ | 39 | 16.3 |
| $CH2^+$ | 14 | 45.5 | $C3H7^+$ | 43 | 14.8 |
| $OH^+$ | 17 | 37.5 | $CHO2^+$ | 45 | 14.2 |
| $H2O^+$ | 18 | 35.4 | $Ti^+$ | 48 | 13.3 |
| $C2^+$ | 24 | 26.5 | $V^+$ | 51 | 12.5 |
| $C2H2^+$ | 26 | 24.5 | $Cr^+$ | 52 | 12.3 |
| $CO^+$ | 28 | 22.8 | $Mn^+$ | 55 | 11.6 |
| $NO^+$ | 30 | 21.2 | $Fe^+$ | 56 | 11.4 |
| $CH3O^+$ | 31 | 20.5 | $Co^+$ | 59 | 10.8 |

The list illustrates the fact that the gyrofrequencies of combustion ions are low and the heavier ions of the metals of the engine's structure are lower.

A second source of radiation from these same ions is due to the mechanical acceleration of the ions by the fluid motion of the combustion gas. The frequencies radiated are expected to reflect the helmholtz resonance of the combustion chamber, curvature of nozzles, blade passing frequencies of turbines, and the motion of pistons and valves in internal combustion engines. The acoustic and mechanical frequencies of the interior of the engine are also very low when compared with common radio processes. Turbines rotate at several hundred hertz to produce blade passing frequency of a few kilohertz.

The source strengths of all the radiation generated is a function of temperature and fuel rate. The proportion of fuel molecules ionized in a simple hydrocarbon flame is on the order of $10^{-8}$. The number of ions created at a hot spot is difficult to determine but several facts are relevant: The temperature of fuel ions is frequently lower than the adiabatic flame temperature of the combustion due to the heat capacity of the fuel droplets, fuel is cooled by the inert nitrogen of combustion air, while the can wall and turbine blades are heated constantly by radiation from the flame. Additionally, the average ionization potential of metals is lower than that of the constituents of hydrocarbon fuels and air. Proportionally, the metals will produce more ions than a similar volume of combustion gas, but the number of atoms available to make ions in the hot spot is several orders of magnitude smaller than in the combustion gas. The result is an ion number that is smaller than for the combustion gas but still large enough to be measured. The interaction of ions and all accelerations imposed by the earth's magnetic field and the acoustic field in the turbine area causes electromagnetic radiation. Enough ions are created to be detectable in the exhaust stream. An antenna in the combustion chamber or around the exhaust stream can detect a source of this level.

BRIEF DESCRIPTION OF THE DRAWINGS

The accompanying drawings (FIGS. 1 and 1A) illustrate the major features of the present invention. It also shows the flow of signals through the device as would occur with it in operation.

GENERAL DESCRIPTION OF THE PREFERRED EMBODIMENT

Referring to FIG. 1, there is shown a block diagram of the soot measurement device. It has a sensor 2, that is a simple antenna suitable for detecting the very low cyclotronic and mechanically activated frequencies of the soot. The sensor feeds a signal conditioner element 4, that contains an amplifier stage 6, and a filter 7. The amplifier boosts the signal from the antenna to a level that is usable by the remainder of the instrument. The filter eliminates information outside the band of interest and particularly reduces the potential for aliased frequencies in the digitally sampled data. The output of the signal conditioner is passed to an analog-to-digital converter 8, that samples the sensor data at an appropriate rate and sends it to the signal processor 10. The signal processor performs spectrum analysis, integration, and level detection. This product is passed to the display device 12, for the device to register its alert for operators.

DESCRIPTION OF ALTERNATIVE EMBODIMENTS

Interference due to the local ambient electromagnetic noise field can be reduced by having three principal sensors, oriented orthogonally, processed independently to correlate their outputs to enhance the signal of the sensor pointed at the source of the soot. The above alternative embodiment is illustrated in FIG. 1A.

The variation of the earth's magnetic field causes the frequencies of ion emissions to be spread during the integration period of the detection processor The spreading can be reduced by adding a magnetometer sensor and adaptive processing to the signal processing state of the device. The magnetic field measurement can be taken at each sample of the soot sensors to allow the sensor signal frequency to be computed at the measured field valve, rather than at the fixed mean field value.

What is claimed is:

1. A method of measuring the imminent failure of an engine which produces an electromagnetic radiation spectrum including electromagnetic radiation from moving ions which form as a result of deteriorating engine components, comprising measuring said electromagnetic radiation, determining the spectrum of said electromagnetic radiation and processing said electromagnetic radiation spectrum to identify the ions which are indicative of the deteriorating engine components.

2. The method of claim 1 including the step of shutting down said engine upon sensing ions from said engine components above a predetermined level.

3. The method of claim 1 wherein said engine is a gas turbine and said engine components include combustion cans, turbine blades and turbine casings.

4. A device for measuring imminent failure of an engine which produces an electromagnetic radiation spectrum including electromagnetic radiation from moving ions which form as a result of deteriorating engine components, comprising means for measuring said electromagnetic radiation to obtain the spectrum thereof and means for processing said electromagnetic radiation spectrum to identify the ions which are indicative of the deteriorating engine components.

5. The device of claim 4 wherein said engine is a gas turbine and said engine components include combustion cans, turbine blades and turbine casings.

6. The device of claim 4 wherein said spectrum is the result of acceleration of the ions by ambient magnetic and hydrodynamic forces.

7. The device of claim 4 wherein the means for measuring said electromagnetic radiation is provided with sensors having directionality so as to reduce the influence of ambient electromagnetic noise arriving at said sensors from directions other than that of said engine emission source.

* * * * *